Sept. 13, 1955 R. F. SMITH 2,717,680
CLUTCH
Filed Dec. 17, 1952

INVENTOR.
Robert F. Smith.
BY Harness & Harris
ATTORNEYS.

United States Patent Office 2,717,680
Patented Sept. 13, 1955

2,717,680

CLUTCH

Robert F. Smith, Detroit, Mich., assignor to Chrysler Corporation, Highland Park, Mich., a corporation of Delaware Application December 17, 1952, Serial No. 326,410

1 Claim. (Cl. 192—91)

This invention relates to improvements in clutches and more particularly to friction drive clutches although not necessarily limited thereto.

An object of the invention is to provide an improved power operated mechanism for controlling clutch operation and more specifically to effect release of the driving connection established by the clutch. As applied to a friction clutch, the improved mechanism operates to relatively separate frictionally engaged clutch drive elements to thereby release the drive through such elements.

Another object of the invention is to provide a relatively simple an inexpensive structure including a fluid pressure receiving chamber or cylinder and an operator actuated on its power stroke by pressure of fluid in the cylinder to effect release of the drive through the clutch; and to arrange the aforesaid structure in concentric relationship with one of the structures included in the drive established by the clutch.

A still further object of the invention is to provide a sleeve-like wall structure defining a fluid pressure receiving chamber or cylinder which, in conjunction with a sleeve-like reaction member, serves as the fluid pressure actuated power operator and carries a bearing unit for transmitting a releasing thrust to clutch release means during the power stroke of the operator. Preferably, the bearing unit engages the clutch release means during transmission of drive through the friction clutch to an extent that a race of the bearing unit may rotate with the release means, and the operating mechanism is self-adjusting to compensate for wear of the frictionally engaged components of the clutch.

Other advantages and features of the invention will be more apparent from the following description taken in conjunction with the accompanying drawings, in which.

Figures 1, 2:
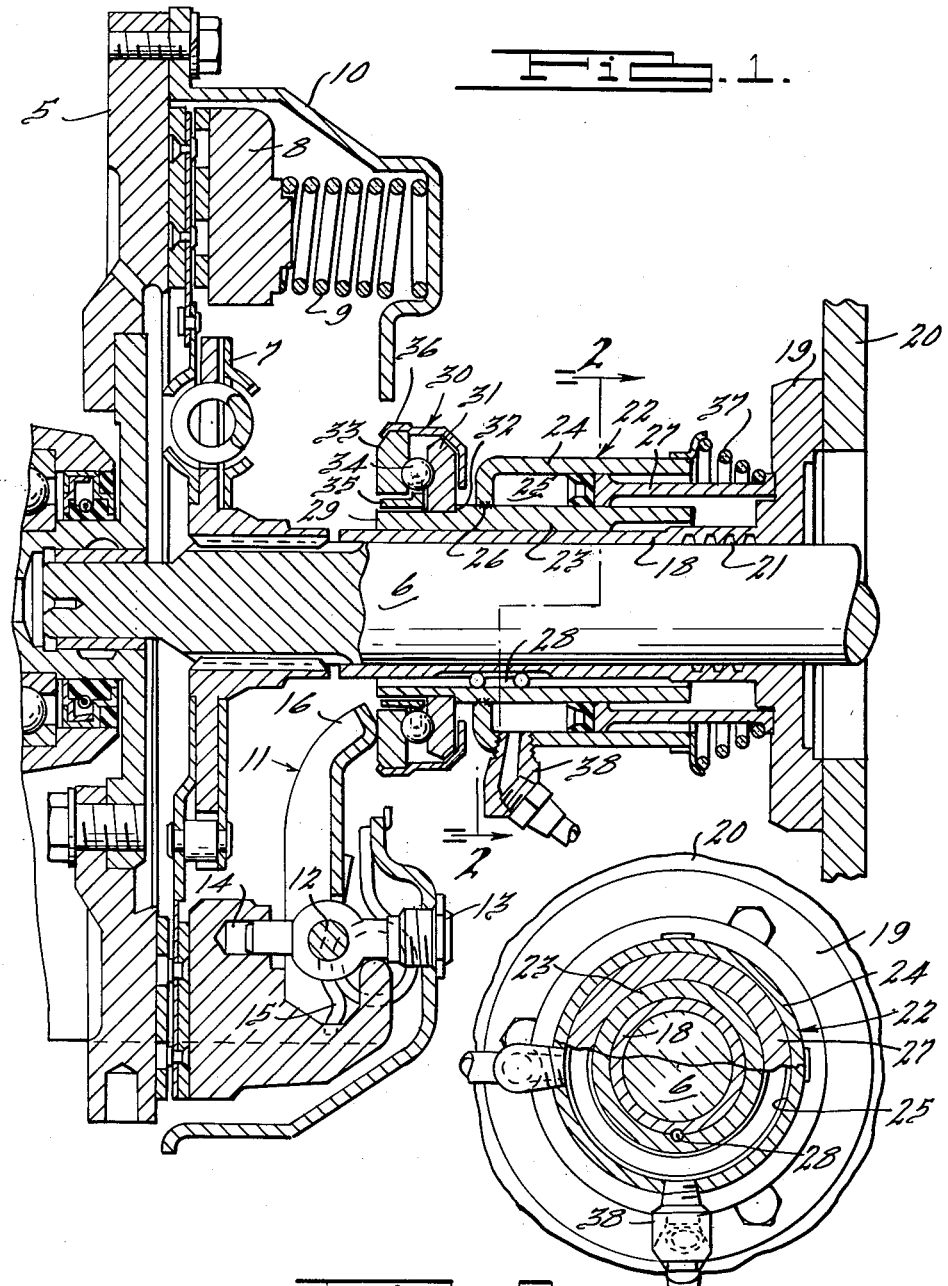
Fig. 1 is a sectional elevational view of a friction clutch and the operating mechanism therefor embodying the invention.
Fig. 2 is a vertical sectional view taken on line 2—2 of Fig. 1.

Referring to the drawings, the invention is illustrated and described in a friction drive clutch of the well known type currently used and includes a driving disc or flywheel 5 in which is journalled one end of a driven shaft 6 which may be the input drive shaft for a multi-ratio change speed mechanism, not shown. A friction drive disc 7 is splined on shaft 6 and is maintained in frictional driving engagement with flywheel 5 by a pressure ring 8 under the influence of a plurality of circumferentially spaced pressure springs, one of which is shown at 9, acting between the ring 8 and a cover 10 bolted to the flywheel 5. To release the drive through the clutch, the flywheel 5 and disc 7 are relatively separated by withdrawing the pressure ring 8 against the resistance of springs 9 and thus withdrawal is forcibly effected by rotation of a plurality of circumferentially spaced release levers, one of which is shown at 11. Each lever 11 is mounted on a release lever pin 12 which extends through the eye of bolt 13, the latter extending through an opening in the cover 10 in threaded engagement with the wall of the opening, and the end of bolt 13 sliding in an opening 14 in the ring 8. The mounting of the lever 11 provides a relatively short lower arm 15 and a relatively long upper arm 16 adapted to receive an operating thrust to rotate the arm in an anti-clockwise direction as viewed in Fig. 1. As a result of this rotation the lower arm 15 acts on the pressure ring 8 to move the same axially away from the disc 7 against the resistance of springs 9 and the disc 7 is thereby released from its driving engagement with the flywheel 5. When the levers 11 are relieved of such thrust the springs 9 re-establish the frictional drive engagement.

The shaft 6 may constitute the input drive shaft for a change speed mechanism, not shown, and is journalled in a sleeve-like member 18 having a radial flange 19 at one end thereof adapted to be detachably connected to the housing 20 for the change speed mechanism. The member 18 is thus stationary rotatively and axially and has a threaded section 21 to direct lubricant in a direction away from the friction clutch.

The mechanism for operating the clutch release levers 11 is mounted on the member 18 concentric with the latter and the shaft 6 and comprises a sleeve-like wall structure generally indicated by the numeral 22. This structure includes an inner tubular sleeve 23 and an outer sleeve 24 of larger diameter than sleeve 23 to provide a chamber or cylinder 25 therebetween adapted to receive fluid under pressure. This cylinder is open at one end and closed at the other end by deflecting an end portion of the sleeve 24 inwardly to abut sleeve 23 and welding for otherwise securing the same together in fluid tight relation. By way of example this attachment may be done by copper hydrogen brazing as indicated at 26. A fluid pressure reacting sleeve-like member 27 extends into the cylinder 25 and has one end abutting the flange 19. The wall structure 22 is retained against rotation relative to member 25 by a plurality of balls engaged in registering keyway into member 18 and inner sleeve 23 one of such ball and keyway connections being illustrated at 28.

The inner sleeve 23 has a portion 29 of reduced diameter on which is mounted a bearing unit generally indicated at 30 and including a first race 31 rotatably pressed onto the part 39 and abutting a shoulder 32 of sleeve 23. The unit 30 includes a second race 33 which abuts the arm 16 of levers 11 during transmission of the drive through the clutch and rotates with said lever arms relative to bearing race 31. A plurality of balls 34 between the races 31, 33 are maintained in circumferentially spaced relationship by a separator 35. A lubricant retaining cover 36 is secured to the bearing race 33 for rotation therewith and relative to sleeve 31. A coil spring 37 acts between the wall structure 22 and member 27 to bias the wall structure axially to a position in which the bearing race 33 is maintained in contact with lever arm 16 during transmission of drive through the clutch.

Fluid under pressure is admitted to cylinder or chamber 25 through a fitting 38 directed into an opening in the outer sleeve 24. The fluid pressure may be derived from any suitable source and by way of example and not limitation such source may be a master cylinder of the type commonly employed in brakes for motor vehicles and illustrated in U. S. Patent No. 1,988,395. However, the mechanism herein can be operated without the retention of residual pressure as commonly employed in the above brake master cylinders, in view of the action of the spring 37. However, with such residual pressure the spring 37 may be omitted and the degree of residue be determined to provide the engagement between the bearing race 33 and release lever arm 16 as mentioned above.

In operation of the mechanism the clutch is illustrated with the friction drive parts engaged for transmitting drive to shaft 6 and the bearing unit 30 is engaged with the release lever arm 16. For releasing the drive through the clutch fluid under pressure is admitted to cylinder 25 and the wall structure 22 and bearing unit 30 are shifted axially to rotate the lever arms 11 in a counter-clockwise direction as viewed in Fig. 1 against the resistance of the springs 9. During such rotation the lever arms 15 withdraw the pressure ring 8 against the resistance of springs 9 and thus release the disc from driving engagement with flywheel 5. When the fluid pressure in cylinder 25 is relieved the springs 9 return the friction clutch drive parts into driving engagement and acting through levers 11 return the bearing unit 36 and wall structure 22 to the at rest position of the mechanism illustrated in Fig. 1.

Various changes including the size, shape and arrangement of parts may be made without departing from the spirit of the invention and it is not my intention to limit the invention other than by the claim.

I claim:

In a friction clutch mechanism for releasably drivingly connecting a shaft with a driver, clutch release elements rotatable in one direction to release the drive through the mechanism, and means for rotating said elements in said one direction including a first sleeve concentric with said shaft and having spaced walls defining a chamber adapted to receive fluid under pressure, a second sleeve concentric with said shaft and extending into said chamber, said first sleeve being axially movable by pressure fluid in said chamber, a stop limiting axial movement of said second sleeve by pressure fluid in said chamber, a bearing unit mounted on said first sleeve for axial movement therewith and engaging said elements during said axial movement to rotate said elements in said one direction, and a spring between said sleeves biasing said second sleeve axially in a direction to engage its said stop and said spring biasing said first sleeve axially in a direction to engage said bearing unit with said release elements.

References Cited in the file of this patent

UNITED STATES PATENTS

| | | |
|---|---|---|
| 1,611,545 | Maybach | Dec. 21, 1926 |
| 2,057,744 | Sanford | Oct. 20, 1936 |
| 2,501,005 | Rockwell | Mar. 21, 1950 |
| 2,564,281 | Rockwell | Aug. 14, 1951 |

FOREIGN PATENTS

| | | |
|---|---|---|
| 765,330 | France | Mar. 19, 1934 |